US010242234B2

(12) United States Patent
Allo

(10) Patent No.: US 10,242,234 B2
(45) Date of Patent: Mar. 26, 2019

(54) WIRELESS ENABLED SECURE STORAGE DRIVE

(71) Applicant: SEAGATE TECHNOLOGY LLC, Cupertino, CA (US)

(72) Inventor: Christopher Nicholas Allo, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/211,932

(22) Filed: Jul. 15, 2016

(65) Prior Publication Data

US 2018/0020011 A1 Jan. 18, 2018

(51) Int. Cl.

| | |
|---|---|
| ***G06F 21/78*** | (2013.01) |
| ***H04L 29/06*** | (2006.01) |
| ***H04W 12/02*** | (2009.01) |

(52) U.S. Cl.

CPC .............. *G06F 21/78* (2013.01); *H04L 63/18* (2013.01); *H04W 12/02* (2013.01); *H04L 63/06* (2013.01); *H04L 63/0823* (2013.01); *H04L 63/1416* (2013.01); *H04L 63/166* (2013.01)

(58) Field of Classification Search

CPC ......... H04L 63/14; H04L 63/08; H04L 63/16; H04L 63/06; H04L 63/0823; H04L 63/166; H04L 63/1416; H04L 63/18; G06F 21/78; H04W 12/02

See application file for complete search history.

(56) References Cited

U.S. PATENT DOCUMENTS

| | | | | |
|---|---|---|---|---|
| 7,178,031 | B1 | 2/2007 | Seger | |
| 9,300,656 | B2 | 3/2016 | Ashley et al. | |
| 2007/0294457 | A1 | 12/2007 | Gantman et al. | |
| 2011/0066848 | A1* | 3/2011 | Zilinskas | G06F 21/335 713/156 |
| 2012/0122543 | A1* | 5/2012 | Watkins | G07F 17/3262 463/20 |
| 2012/0122585 | A1* | 5/2012 | Nguyen | G07F 17/3218 463/42 |
| 2014/0173581 | A1* | 6/2014 | Grinberg | G06F 8/654 717/170 |
| 2015/0081846 | A1* | 3/2015 | Ur-Rahman | H04L 67/141 709/218 |
| 2015/0358338 | A1* | 12/2015 | Zeitlin | H04L 63/1416 726/23 |
| 2016/0182499 | A1* | 6/2016 | Sharaga | H04L 63/0853 713/156 |

* cited by examiner

*Primary Examiner* — Ayoub Alata
(74) *Attorney, Agent, or Firm* — Holland & Hart

(57) ABSTRACT

Systems and methods for wireless enabled security in relation to a storage drive are described. In one embodiment, the systems and methods may include receiving, at a storage drive, a request from a host of the storage drive. In some cases, the request may be received via a wired connection between the storage drive and the host. In some embodiments, the systems and methods may include determining whether the request is flagged by the host as a secure connection request, processing the request upon determining the request is not flagged as a secure connection request, and establishing a wireless connection with the host upon determining the request is flagged by the host as a secure connection request.

16 Claims, 6 Drawing Sheets

WIRELESS ENABLED SECURE STORAGE DRIVE

SUMMARY

The present disclosure is directed to methods and systems for wireless enabled security in relation to a storage drive. A storage device for providing wireless enabled security in relation to a storage drive is also disclosed. In one embodiment, the storage drive may include a controller and a wireless circuit. In some embodiments, the controller may be configured to receive a request from a host of the storage drive and determine whether the request is flagged by the host as a secure connection request. In some cases, the wireless circuit may be configured to establish a wireless connection with the host upon the controller determining the request is flagged by the host as a secure connection request.

In some cases, the request may be received by the controller via a wired connection between the storage drive and the host. In some embodiments, the wired connection may include at least one of an integrated drive electronics (IDE) connection, advanced host controller interface (AHCI) connection, advanced technology attachment (ATA) connection, serial ATA (SATA) connection, serial attached small computer system interface (SAS) connection, and non-volatile memory express (NVME) connection.

In some embodiments, the controller may be configured to verify, over the wireless connection, a security element included in the request. In some cases, the security element may include a key associated with an X.509 certificate stored on the storage drive. In some embodiments, verifying the security element may include verifying the key associated with the X.509 certificate.

In some embodiments, the controller may be configured to report a security breach to a predetermined recipient upon determining the security element fails verification and bypass sending a response to the host that verification of the request failed. In some cases, the wireless circuit may be configured to establish, over the wireless connection, a secure wireless connection between the storage drive and the host upon verifying the security element. In some cases, the secure wireless connection may be established based at least in part on a transport layer security (TLS) protocol.

In some embodiments, the controller may be configured to perform a security scan of the storage drive upon establishing the secure wireless connection. In some cases, performing the security scan may include verifying firmware installed on the storage drive. In some embodiments, the controller may be configured to download a replacement firmware to the storage drive and install the replacement firmware on the drive upon determining the firmware installed on the storage drive fails verification.

In some cases, performing the security scan may include verifying a security certificate stored on the storage drive. In some embodiments, the controller may be configured to download a replacement certificate to the storage drive upon determining the certificate stored on the storage drive fails verification and implement the replacement certificate on the drive.

An apparatus for wireless enabled security in relation to a storage drive is also described. In one embodiment, the apparatus may include a processor, memory in electronic communication with the processor, and instructions stored in the memory, the instructions being executable by the processor to perform the steps of receiving a request from a host of the apparatus, determining whether the request is flagged by the host as a secure connection request, and establishing a wireless connection with the host upon the controller determining the request is flagged by the host as a secure connection request.

A method for wireless enabled security in relation to a storage drive is also described. In one embodiment, the method may include receiving, at a storage drive, a request from a host of the storage drive. In some cases, the request may be received via a wired connection between the storage drive and the host. In some embodiments, the method may include determining whether the request is flagged by the host as a secure connection request, processing the request upon determining the request is not flagged as a secure connection request, and establishing a wireless connection with the host upon determining the request is flagged by the host as a secure connection request.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Figure 1:
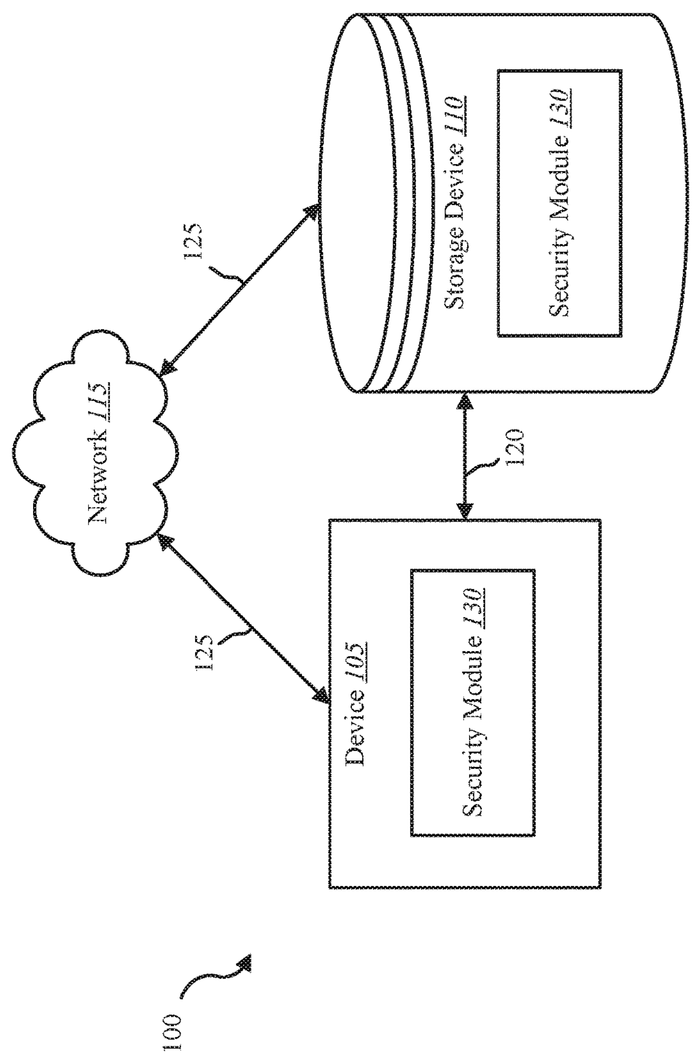
FIG. 1 is a block diagram of an example of a system in accordance with various embodiments.

The following relates generally to wireless enabled security in relation to a storage drive. In one embodiment, the systems and methods may include verifying a request to establish a wireless connection between a host and a storage drive in conjunction with a wired connection already established between the host and the storage drive.

Public-key cryptography, or asymmetric cryptography, is a cryptographic system that uses pairs of keys to encrypt data. Public keys may be disseminated to the general public and may be paired with private keys that are known only to the owner. A public key may be used to authenticate that a message originated with a holder of the paired private key. In some cases, a message may be encrypted with a public key to ensure that only the holder of the paired private key can decrypt the message.

In a public-key encryption system, any person can encrypt a message using the public key, but such a message can be decrypted only with the private key. The strength of a public-key cryptography system relies on the degree of difficulty, or computational impracticality, for a properly generated private key to be determined from its corresponding public key. Security then depends on keeping the private key private, while the public key may be published without compromising security.

In cryptography, a public key certificate, also known as a digital certificate or identity certificate, is an electronic document used to prove ownership of a public key. The certificate includes information about the key, information about its owner's identity, and the digital signature of an entity that has verified the certificate's contents are correct. If the signature is valid, and a computer and/or computer user examining the certificate trusts the entity that signed the certificate, then the computer and/or computer user trusts the request and uses the key to communicate with the key's owner.

In a typical public-key infrastructure (PKI) scheme, the signer is a certificate authority (CA), usually a company that charges customers to issue certificates on their behalf. In a web of trust scheme, the signer is either the key's owner (a self-signed certificate) or an endorsement provided by another entity that the receiver examining the certificate may know and/or have reason to trust.

In cryptography, X.509 is a standard for a PKI to manage digital certificates and public-key encryption. An X.509 certificate may contain information about the identity to which a certificate is issued and the identity that issued it. X.509 may specify formats for any combination of public key certificates, certificate revocation lists, attribute certificates, and a certification path validation algorithm. Information in an X.509 certificate may include a version, serial number, algorithm information, issuer distinguished name, validity period, subject distinguished name, subject public key information, and extensions. The version of the X.509 certificate may indicate the capabilities of the certificate and what data the certificate may include. For example, a version 3 X.509 certificate may have capabilities that a version 1 X.509 certificate does not have, etc. A serial number, such as a globally unique identifier (GUID), may be assigned to the certificate that distinguishes it from all other certificates. The algorithm information may specify the algorithm used by the issuer to sign the certificate. The issuer distinguished name may include the name of the entity issuing the certificate such as a CA. The validity period of the certificate may specify a valid time period in which the certificate is deemed valid. The validity period may include a start date/time and/or an end date/time in which the certificate is valid. The subject distinguished name may specify the name of the identity the certificate is issued to. The subject public key information may specify the public key associated with the identity. An extension of the X.509 certificate may specify how the certificate may be used and/or any restrictions in relation to the certificate such as whether the certificate belongs to a CA, a bitmap specifying the cryptographic operations that may be performed, etc.

Digital certificates, such as those used with the X.509 standard, may be a component used in the transport layer security (TLS) protocol. TLS and its predecessor, secure sockets layer (SSL), are cryptographic protocols that provide communications security over a computer network. TLS may be used to secure web and email communication, provide email encryption and code signing, etc. For example, TLS may be used to prevent an attacker from impersonating a secure website or other server. The TLS protocol provides privacy and data integrity between two communicating computer applications. A connection between a client such as a web browser and a server such as wikipedia.org may be secured using TLS. A TLS connection is private because symmetric cryptography is used to encrypt the data transmitted. The keys for this symmetric encryption are generated uniquely for each connection and are based on a shared secret negotiated at the start of the session based on a TLS handshake protocol. The server and client negotiate the details of which encryption algorithm and cryptographic keys to use before the first byte of data is transmitted. The negotiation of a shared secret is secure. The negotiated secret is unavailable to eavesdroppers and cannot be obtained even by an attacker who infiltrates into the middle of the connection. The negotiated secret is reliable because an attacker cannot modify the communications during the negotiation without being detected. The connection is reliable because each message transmitted includes a message integrity check using a message authentication code to prevent undetected loss or alteration of the data during transmission. In some cases, the identity of the communicating parties may be authenticated using public-key cryptography. This authentication may be optional, but in some cases, may be used for at least one of the parties, typically the server.

A self-encrypting drive (SED) may include a storage drive configured with a circuit built into or connected with a controller chip of the storage drive. The encryption chip may be configured to encrypt all data written to the storage media and decrypt all data from the media automatically and transparently to the user. In some cases, the user may provide a password. The password may be used in conjunction with the encryption security of the drive to encrypt or decrypt the media encryption key. In this way even the media encryption key is not discoverable without knowing the password. In some cases, a secure connection may be established with the storage drive. The secure connection may enable access to encrypted data stored on the storage drive. Accordingly, the present disclosure describes systems and methods to prevent potential malicious entities from accessing sensitive data on the storage drive, performing secure operations on the storage drive, and/or modifying operation of the storage drive such as modifying firmware, modifying a digital certificate, etc.

In some cases, the present disclosure describes a secondary level of security confirmation to establish a secure remote connection to the storage drive to inspect and/or modify an operation of a storage drive. For example, a remote secure connection may be established to verify a version of firmware loaded on the storage drive, verify the integrity of the firmware, perform a malware scan on the storage drive, download firmware, remove firmware, install firmware, check the integrity of a certificate on the drive, download a certificate, remove a certificate, implement a certificate, manage an aspect of the storage drive, inspect the storage drive on a system level, run diagnostics on the storage drive, inspect one or more encryption keys implemented on the storage drive. In some cases, pre-shared keys may be used to verify a request to establish a secure connection. Additionally, or alternatively, a digital certificate such as an X.509 certificate may be stored on the storage drive and used to verify requests to establish secure connections.

Currently, verifying the security of storage drive software and keeping secure and updating versions of software on deployed drives may be performed in an insecure manner. Drive firmware security may be managed through a manufacturing process, but once the drive is deployed it becomes more difficult to verify drive firmware and/or to send secure firmware updates to the storage drives.

The present systems and methods provides the addition of a wireless device to the current electronics on a storage drive such as a system on chip (SOC). The wireless enabled drives may provide secure communications with a remote server in conjunction with digital certificates to enable verification of drive status (clean from malware, infected by malware, for example), firmware revision, and to be able to download updated certificates or take drives out of service that have been compromised.

In some embodiments, the present systems and methods may include adding a wireless chip to a storage drive. For example, the wireless chip may be added to a self-encrypting drive (SED) to protect the operation of the storage drive via secure firmware updates, secure diagnostic checks, etc. In some embodiments, the storage drive's firmware may be configured to support X.509 certificates and a TLS communication layer. The wireless enabled storage drive may enable secure communications between a host and the drive firmware through a TLS communication path that can be used to determine security of a drive, drive firmware revision, and updating firmware and/or drive certificates to enforce security standards. As one example, a third party may connect to a host of the storage drive and from the host request a secure connection with the storage drive. Upon verifying the request, the secure connection may be established between the third party and the storage drive through the host.

FIG. 1 is a block diagram illustrating one embodiment of an environment 100 in which the present systems and methods may be implemented. The environment may include device 105, storage device 110, network 115, wired connection 120, and wireless connection 125. The storage device 110 may include any combination of storage drives such as hard disk drives, solid state drives, and hybrid drives that include storage media of both hard disk and solid state drives. In some embodiments, the systems and methods described herein may be performed on a single device such as device 105. In some cases, the methods described herein may be performed on multiple storage devices or a network of storage devices.

Examples of device 105 may include a storage server, a storage enclosure, a storage controller, storage drives in a distributed storage system, storage drives on a cloud storage system, storage devices on personal computing devices, storage devices on a server, or any combination thereof. In some embodiments, device 105 may include storage drive electronics such as any combination of printed circuit boards, electronic components, memories, chips, and processors of storage device 110. In some cases, device 105 may include a host of storage device 110. For example, device 105 may include an operating system of a machine hosting storage device 110, firmware of a machine hosting storage device 110, hardware of a machine hosting storage device 110, or any combination thereof. In some configurations, device 105 may include a security module 130. In one example, the device 105 may be coupled to storage device 110. In some embodiments, device 105 and storage device 110 may be components of flash memory and/or solid state drive and/or a component of a host of the storage device 110 such as an operating system, host hardware system, or any combination thereof.

In one embodiment, device 105 may be a computing device with one or more processors, memory, and/or one or more storage devices. In some cases, device 105 may include a wireless storage device. In some embodiments, device 105 may include a cloud drive for a home or office setting. In one embodiment, device 105 may include a network device such as a switch, router, access point, or any combination thereof. In one example, device 105 may be operable to receive data streams, store and/or process data, and/or transmit data from, to, or in conjunction with one or more local and/or remote computing devices.

The device 105 may include a database. In some cases, the database may be internal to device 105. In some embodiments, storage device 110 may include a database. Additionally, or alternatively, the database may include a connection to a wired and/or a wireless database. Additionally, as described in further detail herein, software and/or firmware (for example, stored in memory) may be executed on a processor of device 105. Such software and/or firmware executed on the processor may be operable to cause the device 105 to monitor, process, summarize, present, and/or send a signal associated with the operations described herein.

In some embodiments, storage device 110 may connect to device 105 via one or more networks such as network 115. Examples of network 115 include cloud networks, local area networks (LAN), wide area networks (WAN), virtual private networks (VPN), a personal area network, near-field communication (NFC), a telecommunications network, wireless networks (using 802.11, for example), and cellular networks (using 3G and/or LTE, for example), or any combination thereof. In some configurations, the network 115 may include the Internet and/or an intranet. The device 105 may receive and/or send signals over network 115 via wireless connection 125. As one example, device 105 may connect to storage device 110 via wired connection 120 and wireless connection 125 over network 115. In some cases, wired connection 120 may include an integrated drive electronics (IDE) connection, advanced host controller interface (AHCI) connection, advanced technology attachment (ATA) connection, serial ATA (SATA) connection, serial attached small computer system interface (SAS) connection, non-volatile memory express (NVME) connection, or any combination thereof.

In some embodiments, a user may access the functions of device 105 via a local computing device, remote computing device, and/or network device. For example, in some embodiments, device 105 may include an application that interfaces with a user. In some cases, device 105 may include an application that interfaces with one or more functions of a network device, remote computing device, and/or local computing device. In one embodiment, the storage device 110 may be internal to device 105. As one example, device 105 may include a storage controller that interfaces with storage media of storage device 110. In some embodiments, security module 130 may enable device 105 to make wireless connection 125 between device 105 and storage device 110 a secure wireless connection based on a verification of a request to establish the secure wireless connection. Accordingly, device 105 may connect to storage device 110 over wired connection 120 as well as a wireless connection 125 made secure upon verifying the request.

Figure 2:
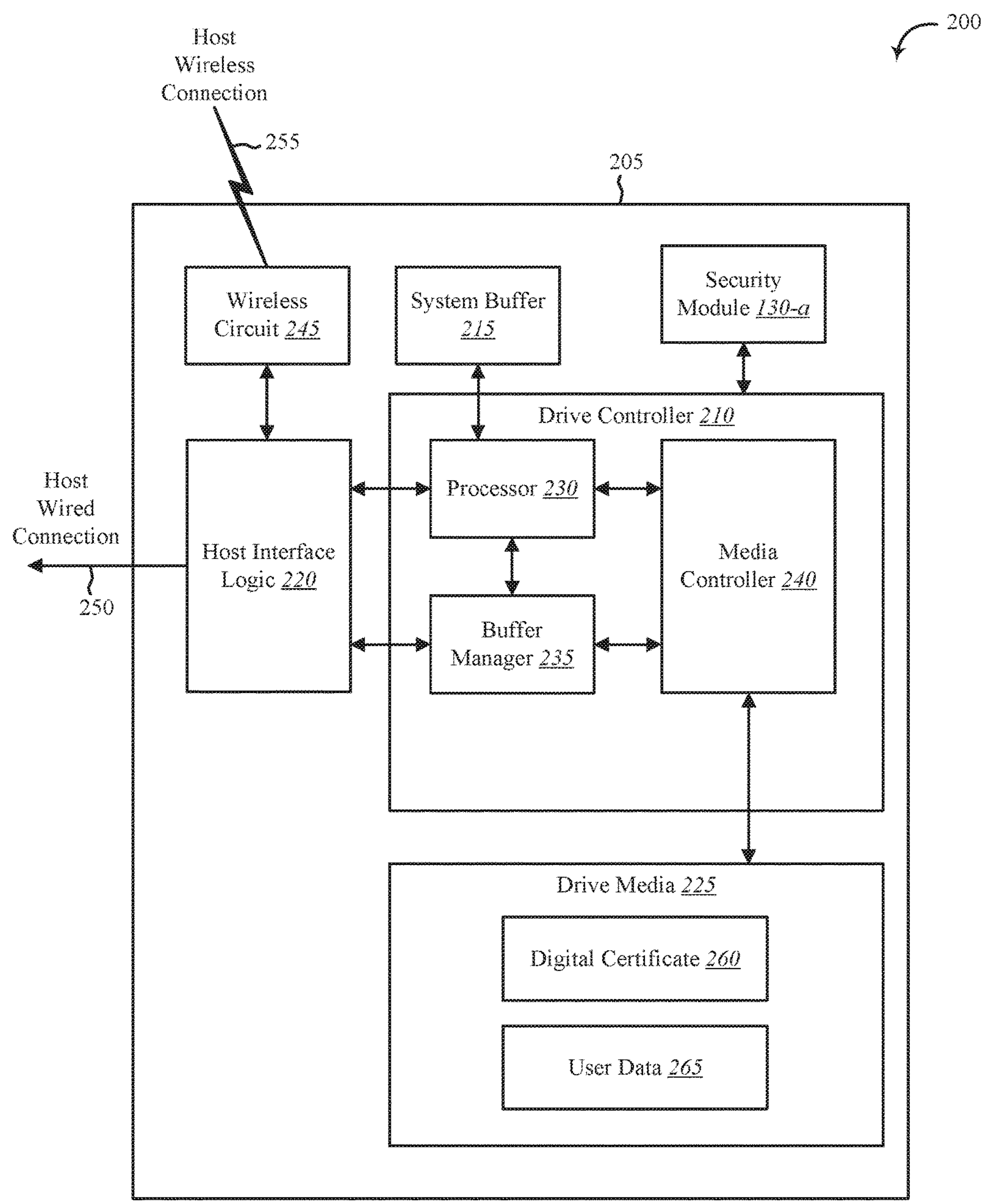
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of one or more aspects of device 105 described with reference to FIG. 1. The apparatus 205 may include a drive controller 210, system buffer 215, host interface logic 220, drive media 225, wireless circuit 245, and security module 130-*a*. Each of these components may be in communication with each other and/or other components directly and/or indirectly.

One or more of the components of the apparatus 205, individually or collectively, may be implemented using one or more system on chip (SOC) and/or application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented—in whole or in part—with instructions embodied in memory formatted to be executed by one or more general and/or application-specific processors.

In one embodiment, the drive controller 210 may include a processor 230, a buffer manager 235, and a media controller 240. As illustrated, drive media 225 may store digital certificate 260 and user data 265. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225 (user data 265, for example). The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215.

In one embodiment, drive media 225 may include one or more disk drive platters, flash memory, or any combination thereof. Digital certificate 260 may include information regarding public keys that are used to verify requests to establish a secure wireless connection via wireless circuit 245. For example, digital certificate 260 may include an X.509 certificate. Although depicted as being stored in drive media 225, in some embodiments, digital certificate 260 may be stored on a flash memory of apparatus 205, but separate from drive media 225. For example, digital certificate 260 may be stored on a secure NOR or secure NAND flash memory chip of apparatus 205.

Although depicted outside of drive controller 210, in some embodiments, security module 130-*a* may include software, firmware, and/or hardware located within drive controller 210. For example, security module 130-*a* may include at least a portions of processor 230, buffer manager 235, and/or media controller 240. In one example, security module 130-*a* may include one or more instructions stored in buffer manager 235, stored in media controller 240, stored in drive media 225, and/or executed by processor 230. The security module 130-*a* may be configured to receive a request to establish a secure connection with a host via wired connection 250. In some cases, security module 130-*a*, in conjunction with wireless circuit 245, may establish wireless connection 255 with the host. In some embodiments, security module 130-*a* may verify the request using digital certificate 260 to verify a security element included in the request such as a public key. Upon verifying the request, security module 130-*a* may make wireless connection 255 a secure wireless connection.

In some embodiments, security module 130-*a* may receive, via wired connection 250, the security element with the request. Alternatively, in some embodiments, security module 130-*a* may receive a request to establish wireless connection 255. After establishing wireless connection 255, security module 130-*a* may receive the security element over wireless connection 255 via wireless circuit 245 and upon verifying the security element, make wireless connection 255 a secure wireless connection between the host and apparatus 205.

In some embodiments, wireless circuit 245 may include a circuit soldered to a printed circuit board of apparatus 205. Additionally, or alternatively, wireless circuit 245 may include a system on chip (SOC) on apparatus 205. In some embodiments, an SOC of apparatus 205 may include wireless circuit 245, a controller such as drive controller 210, one or more additional electrical components such as processors, buffers, logical interfaces, or any combination thereof.

Figure 3:
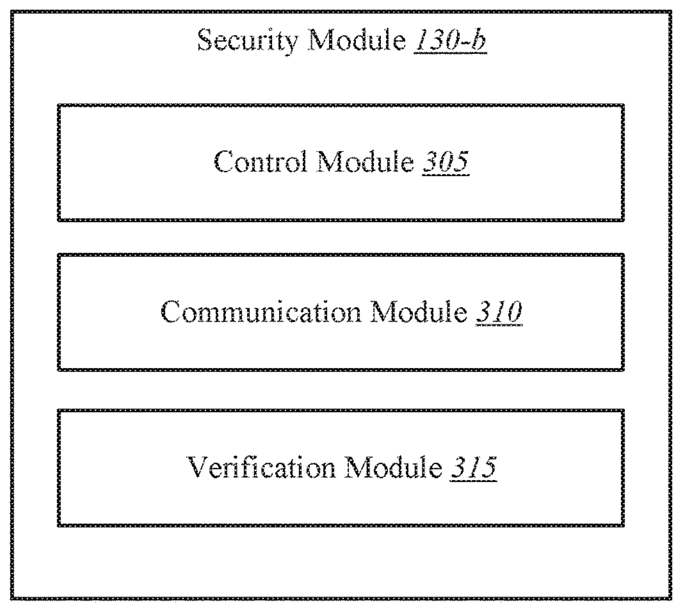
FIG. 3 shows a block diagram of one or more modules in accordance with various aspects of this disclosure.

FIG. 3 shows a block diagram of a security module 130-*b*. The security module 130-*b* may include one or more processors, memory, and/or one or more storage devices. The security module 130-*b* may include control module 305, communication module 310, and verification module 315. The security module 130-*b* may be one example of security module 130 of FIGS. 1 and/or 2. Each of these components may be in communication with each other.

In one embodiment, control module 305 may be configured to receive a request from a host of the storage drive. In one configuration, the host of the storage drive may include hardware, firmware, and/or software hosting the storage drive. For example, the host of the storage drive may include hardware of a computer system such as processor, memory, motherboard, computer chips on the motherboard, adapters and/or cards plugged into the motherboard, or any combination thereof. In some cases, the host of the storage drive may include an operating system, an application installed on the computer system, basic input output (BIOS) of the computer system, drivers, system firmware, or any combination thereof.

In some cases, the request may be received in conjunction with the communication module 310. In one embodiment, control module 305 may analyze the request to determine whether the request is flagged by the host as a secure connection request. In one example, the request may include a communication protocol with one or more communication fields. One of the fields may be used to determine whether or not the request is flagged for a secure connection request. For instance, the host of the storage drive may send a first request with a binary zero in the field to indicate the first request is not a secure connection request. Similarly, the host of the storage drive may send a second request with a binary one in the field to indicate the second request is a secure connection request.

In some embodiments, control module 305 may receive the request through a wired connection between the storage drive and the host. In some cases, the wired connection may include an integrated drive electronics (IDE) connection, advanced host controller interface (AHCI) connection, advanced technology attachment (ATA) connection, serial ATA (SATA) connection, serial attached small computer system interface (SAS) connection, non-volatile memory express (NVME) connection, or any combination thereof.

As stated above, the control module 305 may determine whether a request is flagged for a secure connection request. When the control module 305 determines the request is flagged for a secure connection request, the control module 305 may enact one or more security protocols to verify, validate, and/or authenticate the request from the host to establish a secure connection with the storage drive. When the control module 305 verifies the request, the control module 305 may enable the secure connection to be made between the host and the storage drive.

In one embodiment, communication module 310 may be configured to establish a wireless connection with the host when the control module 305 determines the request is flagged by the host as a secure connection request. Thus, the control module 305 may receive the request via a wired connection between the host and the storage drive. Upon determining the request is flagged as a secure connection request, the communication module 310 may establish a wireless connection between the host and the storage drive. Thus, both a wired connection and a wireless connection may be established between the storage drive and the host at this point.

In some embodiments, verification module 315 may be configured to verify, over the wireless connection, the request to establish a secure connection. In one example, verification module 315 may verify a security element included in the request. In some embodiments, the security element may include a key associated with a digital certificate. For example, the security element may include a key associated with an X.509 certificate stored on the storage drive. Thus, in some embodiments, the verification module 315 may verify the key based at least in part on the X.509 certificate stored on the storage drive. When the verification module 315 verifies the request to establish a secure connection is valid, the control module 305 may enable the secure connection to be established in conjunction with the communication module 310.

In some embodiments, communication module 310 may be configured to report a security breach to a predetermined recipient when the verification module 315 determines the request to establish a secure connection is invalid. For example, when the verification module 315 determines the security element fails verification, communication module 310 may send a notification to an administrator. The notification may be sent via the wired connection and/or the wireless connection. In some cases, the notification sent to the administrator may be encrypted. The notification may indicate that an attempt has been made to establish a secure connection between the host and the storage drive and that the request has failed verification.

In some embodiments, communication module 310 may be configured to bypass or block sending a response back to the host indicating that verification of the request failed. Typically, when an attempt to establish a connection fails, a response may be generated indicating that the attempt has failed. For example, a response may indicate that a password and/or certificate failed. Thus, the response may provide relatively immediate feedback that an element in the request is incorrect and should be changed in order to establish the connection. Accordingly, bypassing sending the response back to the host blocks immediate feedback to a potentially malicious entity attempting to access the storage drive. Instead of receiving feedback that the request has failed, the potentially malicious entity receives no feedback. In some cases, bypassing sending the response back to the host may prevent a potentially malicious entity from determining the attempt was unsuccessful and block the potentially malicious entity from making a second attempt.

In some embodiments, when the verification module 315 verifies the request to establish that the secure connection is valid, the control module 305 may enable the communication module 310 to establish, over the wireless connection, a secure wireless connection between the storage drive and the host. In some cases, the secure wireless connection may be established based at least in part on a cryptographic protocol such as secure socket layer (SSL), transport layer security (TLS), hypertext transfer protocol secure (HTTPS), Z real time protocol (ZRTP), secure RTP (SRTP), secure channel, advanced encryption standard (AES), point to point protocol (PPP), Kerberos protocol, internet key exchange (IKE), internet protocol security (IPSec), or any combination thereof.

In some embodiments, control module 305 may be configured to perform a security scan of the storage drive upon establishing the secure wireless connection between the host and the storage drive. In some cases, performing the security scan may include verification module 315 verifying firmware installed on the storage drive. In some embodiments, control module 305 may be configured to enable communication module 310 to download a replacement firmware to the storage drive. Control module 305 may install the replacement firmware on the storage drive upon determining the firmware installed on the storage drive fails verification. Verification module 315 verifying the firmware may include verifying a version of the firmware, verifying an expiration of the firmware, performing a reliability routine on the firmware, or any combination thereof. In some cases, verification module 315 may verify the installation of the replacement firmware on the drive. For example, verification module 315 may determine that the installation of the firmware is completed, that the firmware performs one or more routines as programmed, that the version of the firmware is up to date, or any combination thereof.

In some embodiments, verification module 315 may be configured to verify a security certificate currently stored on the storage drive. In some embodiments, control module 305 may be configured to enable communication module 310 to download a replacement certificate to the storage drive upon determining the certificate stored on the storage drive fails verification. In some embodiments, control module 305 may be configured to implement the replacement certificate on the drive in place of the certificate currently stored on the drive. In some embodiments, verification module 315 may verify a version of the current certificate, verify an expiration of the current certificate, or any combination thereof. In some cases, verification module 315 may verify the replacement certificate on the drive.

Figure 4:
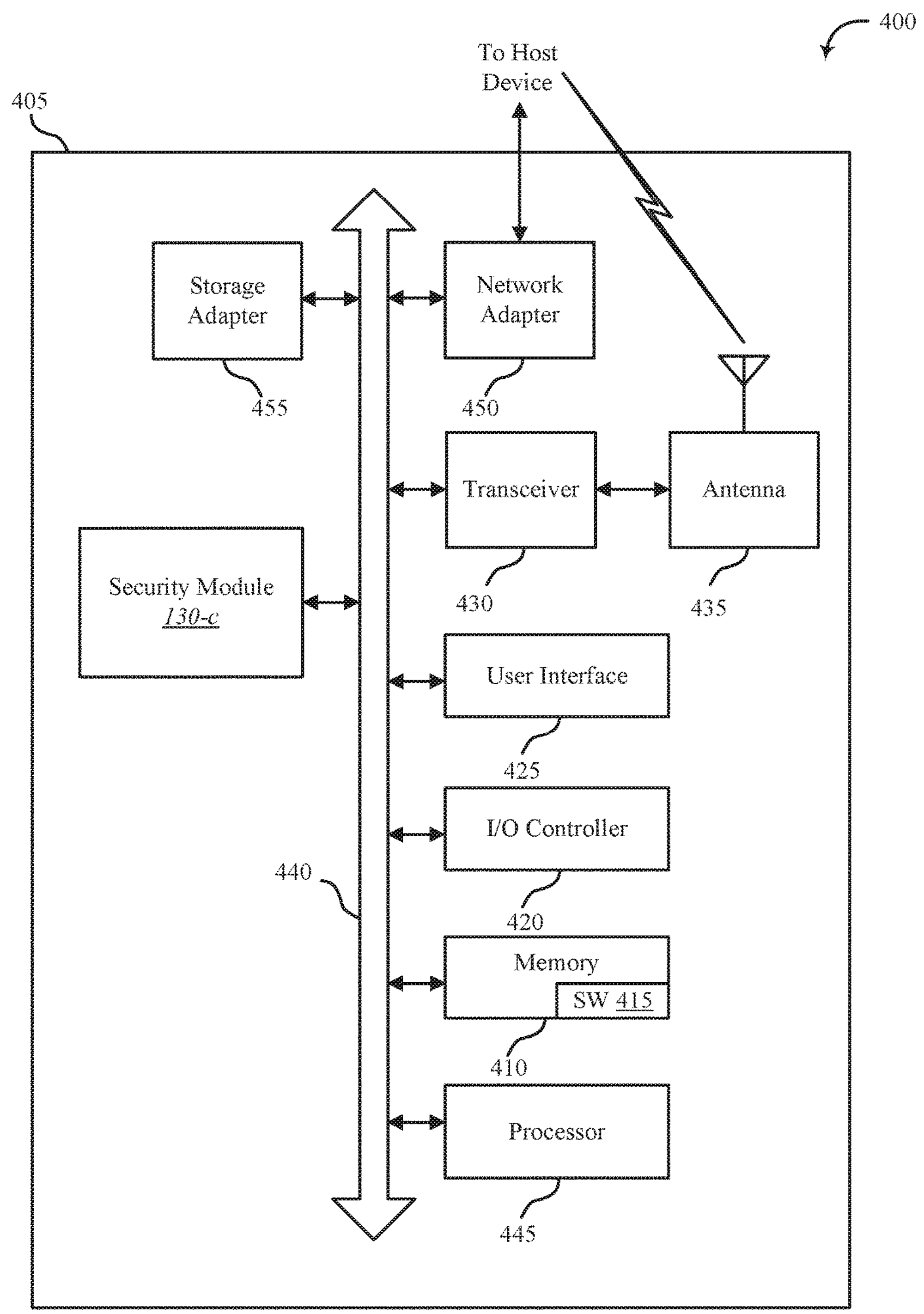
FIG. 4 shows a diagram of a system in accordance with various aspects of this disclosure.

FIG. 4 shows a system 400 for wireless enabled security in relation to a storage drive, in accordance with various examples. System 400 may include an apparatus 405, which may be an example of any one of device 105 and/or storage device 110 of FIG. 1, and/or device 205 of FIG. 2.

Apparatus 405 may include components for bi-directional data communications including components for transmitting communications and components for receiving communications. For example, apparatus 405 may communicate bi-directionally with one or more storage devices and/or host devices. This bi-directional communication may be direct (apparatus 405 communicating directly with a host device, for example) and/or indirect (apparatus 405 communicating indirectly with a host device through a server, for example).

Apparatus 405 may also include a processor module 445, and memory 410 (including software/firmware code (SW) 415), an input/output controller module 420, a user interface module 425, a transceiver module 430, and one or more antennas 435, a network adapter 450, and a storage adapter 455, each of which may communicate, directly or indirectly, with one another (for example, via one or more buses 440). The apparatus 405 may include a security module 130-*c*, which may perform the functions described above for the security module 130 of FIGS. 1, 2, and/or 3.

The software/firmware code 415 may be one example of a software application executing on apparatus 405. The network adapter 450 may communicate bi-directionally, via one or more wired links, with one or more networks and/or host devices. In some embodiments, network adapter 450 may provide a direct connection to a host device via a direct network link to the Internet.

The transceiver module 430 may communicate bi-directionally, via wireless links of the one or more antennas 435, with one or more networks and/or host devices. The transceiver module 430 may include a modem to modulate the packets and provide the modulated packets to the one or more antennas 435 for transmission, and to demodulate packets received from the antenna 435. The apparatus 405 may include multiple antennas 435 capable of concurrently transmitting and/or receiving multiple wireless transmissions. In some embodiments, one element of apparatus 405 (e.g., one or more antennas 435, transceiver module 430, etc.) may provide a direct connection to a storage system and/or host device via a direct network link. In some cases, the direct network link may be through the Internet. In some embodiments, one element of apparatus 405 (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 450 and/or transceiver module 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 405 such as processor module 445, memory 410, I/O controller module 420, user interface module 425, transceiver module 430, antennas 435, network adapter 450, and storage adapter 455, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 445 to perform various functions described in this disclosure. Alternatively, the software/firmware code 415 may not be directly executable by the processor module 445 but may cause a computer (when compiled and executed, for example) to perform functions described herein. Alternatively, the computer-readable, computer-executable software/firmware code 415 may not be directly executable by the processor module 445, but may be configured to cause a computer, when compiled and executed, to perform functions described herein. The processor module 445 may include an intelligent hardware device, for example, a central processing unit (CPU), a microcontroller, system on chip (SOC), an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the security module 130-*c* to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 450 and/or transceiver 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with transceiver module 430, network adapter 450, and/or storage adapter 455. The transceiver module 430 and/or network adapter 450 may enable apparatus 405 with the ability to communicate with host devices such as device 105 of FIG. 1, and/or other devices over a network such as network 115 of FIG. 1. Network adapter 450 may provide one or more wired connections and/or transceiver module 430 may provide one or more wireless network connections. In some cases, transceiver module 430 and/or network adapter 450 may include an Ethernet adapter or Fibre Channel adapter. Storage adapter 455 may enable apparatus 405 to access one or more data storage devices such as storage device 110. The one or more data storage devices may include two or more data tiers each. The storage adapter 455 may include one or more of an Ethernet adapter, a Fibre Channel adapter, Fibre Channel Protocol (FCP) adapter, a SCSI adapter, and iSCSI protocol adapter.

Figure 5:
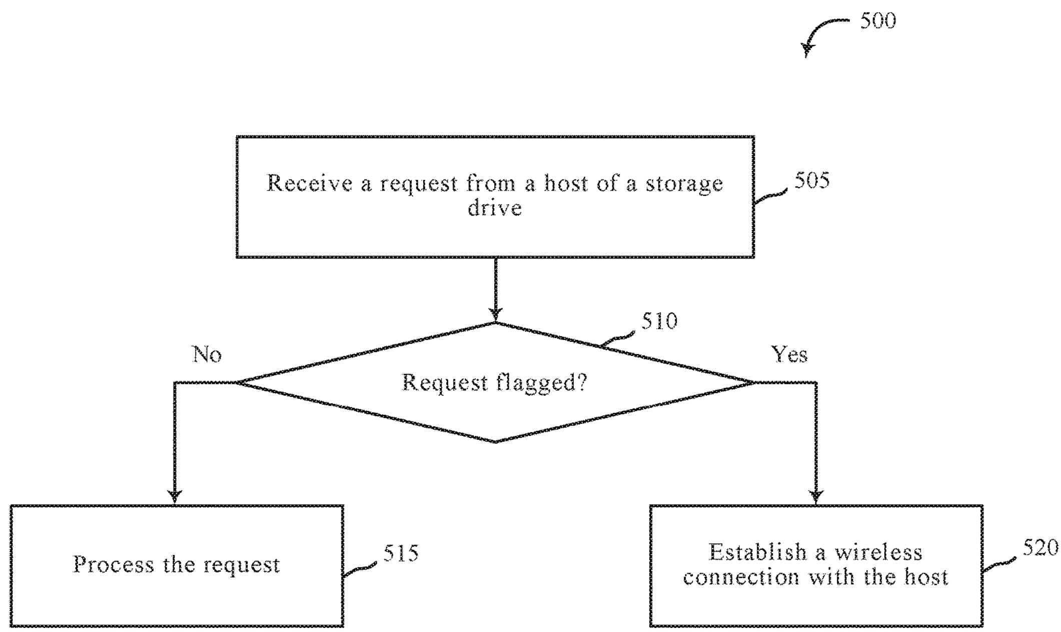
FIG. 5 is a flow chart illustrating an example of a method in accordance with various aspects of this disclosure.

FIG. 5 is a flow chart illustrating an example of a method 500 for wireless enabled security in relation to a storage drive, in accordance with various aspects of the present disclosure. One or more aspects of the method 500 may be implemented in conjunction with device 105 of FIG. 1, apparatus 205 of FIG. 2, and/or security module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 505, the method 500 may include receiving a request from a host of a storage drive. In some cases, the request may be received via a wired connection between the storage drive and the host. At block 510, the method 500 may include determining whether the request is flagged by the host as a secure connection request. At block 515, the method 500 may include processing the request upon determining the request is not flagged as a secure connection request. For example, an un-flagged request may include a request from the host to read user data from and/or write user data to a primary storage medium of the storage drive such as a platter of a hard disk drive, flash memory of a solid state drive, or a platter and/or flash memory of a hybrid drive that includes both platters and flash memory. At block 520, the method 500 may include establishing a wireless connection with the host upon determining the request is flagged by the host as a secure connection request. In some cases, the method 500 may use the established wireless connection to establish a secure wireless connection between the host and the storage drive in conjunction with an authentication process.

The operation(s) at block 505-520 may be performed using the security module 130 described with reference to FIGS. 1-4 and/or another module. Thus, the method 500 may provide for wireless enabled security in relation to a storage drive relating to wireless enabled security in relation to a storage drive. It should be noted that the method 500 is just one implementation and that the operations of the method 500 may be rearranged, omitted, and/or otherwise modified such that other implementations are possible and contemplated.

Figure 6:
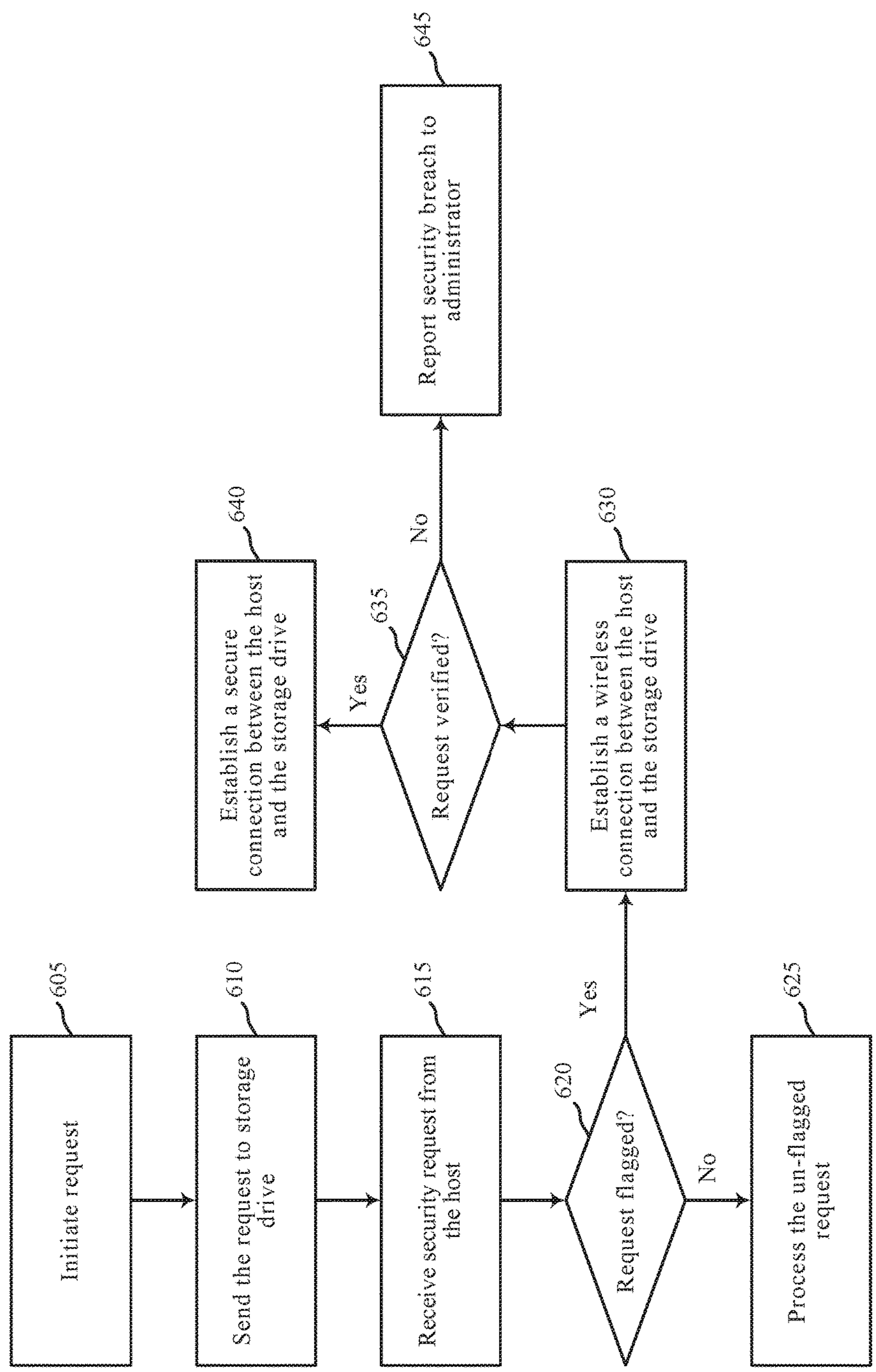
FIG. 6 is a flow chart illustrating an example of a method in accordance with various aspects of this disclosure.

FIG. 6 is a flow chart illustrating an example of a method 600 for wireless enabled security in relation to a storage drive, in accordance with various aspects of the present disclosure. One or more aspects of the method 600 may be implemented in conjunction with device 105 of FIG. 1, apparatus 205 of FIG. 2, and/or security module 130 depicted in FIGS. 1, 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include initiating a request. In some cases, the request may be initiated at a host of a storage drive. In some embodiments, the request may include a security request to establish a secure connection between the host and the storage drive. In some cases, the request may include a non-secure request to read user data from and/or write user data to the storage drive. At block 610, the method 600 may include sending the request to the storage drive. In some embodiments, the request may be sent over a wired connection between the host and the storage drive. In some cases, the request may be encapsulated as a trusted computing group (TCG) request and/or command.

At block 615, the method 600 may include receiving, at the storage drive, the request from the host. At block 620, the method 600 may include determining whether the request is flagged by the host as a secure connection request. At block 625, the method 600 may include processing the request upon determining the request is not flagged as a secure connection request. For example, a non-flagged request may include a request to read user data from and/or write user data to the storage drive over the wired connection. In some cases, the wired connection may include an integrated drive electronics (IDE) connection, advanced host controller interface (AHCI) connection, advanced technology attachment (ATA) connection, serial ATA (SATA) connection, serial attached small computer system interface (SAS) connection, non-volatile memory express (NVME) connection, or any combination thereof.

At block 630, the method 600 may include establishing a wireless connection between the host and the storage drive. Accordingly, in some embodiments, both a wired connection and a wireless connection may be established between the host and the storage drive. At block 635, the method 600 may include determining whether the flagged request is verified. In some embodiments, the method 600 may determine whether a security element included in the flagged request is verified. For example, method 600 may determine whether a public key included in the flagged request is verified by a digital certificate such as an X.509 certificate stored on the storage drive.

At block 640, the method 600 may include establishing a secure connection between the host and the storage drive when the flagged request is verified. In some cases, the secure connection may include a secure wireless connection over the wireless connection established at block 630. In some cases, the method 600 may perform one or more operations using the secure connection. For example, the method 600 may verify firmware on the storage drive, update the firmware, verify a digital certificate, update the digital certificate, perform diagnostics on the storage drive, or any combination thereof.

At block 645, the method 600 may include reporting a security breach to an administrator when the flagged request fails verification. The method 600 may include blocking a response from being sent to the host over the wired and/or wireless connection to prevent a potential malicious entity from realizing the attempt to establish the secure connection failed. Thus, in some cases, the potential malicious entity receives no response regarding the status of the failed attempt while an administrator receives notification that a failed attempt has occurred. In some cases, the method 600 may encrypt the notification sent to the administrator.

The operations at blocks 605-645 may be performed using the security module 130 described with reference to FIGS. 1-4 and/or another module. Thus, the method 600 may provide for wireless enabled security in relation to a storage drive relating to wireless enabled security in relation to a storage drive. It should be noted that the method 600 is just one implementation and that the operations of the method 600 may be rearranged, omitted, and/or otherwise modified such that other implementations are possible and contemplated.

In some examples, aspects from two or more of the methods 500 and 600 may be combined and/or separated. It should be noted that the methods 500 and 600 are just example implementations, and that the operations of the methods 500 and 600 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage system comprising: a storage drive; a controller to receive a request from a host of the storage drive, and determine the request is flagged by the host as a secure connection request, the request being received by the controller via a wired connection between the storage drive and the host, the controller comprising a hardware controller of the storage drive, the host comprising a machine enclosing the storage drive, the secure connection request requesting the storage drive establish a secure wireless connection between the host and the storage drive in addition to the wired connection between the storage drive and the host; a wireless circuit within the storage drive to establish a wireless connection between the storage drive and the host upon the controller determining the request is flagged by the host as the secure connection request; and establish, over the wireless connection, the secure wireless connection between the storage drive and the host upon verifying a security element included in the request.

2. The storage system of claim 1, the wired connection including at least one of an integrated drive electronics (IDE) connection, advanced host controller interface (AHCI) connection, advanced technology attachment (ATA) connection, serial ATA (SATA) connection, serial attached small computer system interface (SAS) connection, and non-volatile memory express (NVME) connection.

3. The storage system of claim 1, the security element including a key associated with an X.509 certificate stored on the storage drive, verifying the security element including verifying the key associated with the X.509 certificate.

4. The storage system of claim 1, comprising the controller to: report a security breach to a predetermined recipient upon determining the security element fails verification; and bypass sending a response to the host that verification of the request failed.

5. The storage system of claim 1, the secure wireless connection being established based at least in part on a transport layer security (TLS) protocol.

6. The storage system of claim 1, comprising the controller to: perform a security scan of the storage drive upon establishing the secure wireless connection.

7. The storage system of claim 6, wherein performing the security scan comprises verifying firmware installed on the storage drive, the controller to: download a replacement firmware to the storage drive and install the replacement firmware on the drive upon determining the firmware installed on the storage drive fails verification.

8. The storage system of claim 6, wherein performing the security scan comprises verifying a security certificate stored on the storage drive, the controller to: download a replacement certificate to the storage drive upon determining the certificate stored on the storage drive fails verification; and implement the replacement certificate on the drive.

9. An apparatus comprising: a controller to: receive a request from a host of the apparatus, the request being received by the controller via a wired connection between the apparatus and the host, the controller comprising a hardware controller of the apparatus, the host comprising a machine enclosing a storage drive; determine the request is flagged by the host as a secure connection request, the secure connection request requesting the storage drive establish a secure wireless connection between the host and the storage drive in addition to the wired connection between the storage drive and the host; establish, via a wireless circuit within the apparatus, a wireless connection between the apparatus and the host upon the controller determining the request is flagged by the host as the secure connection request; and establish, over the wireless connection, the secure wireless connection between the storage drive and the host upon verifying a security element included in the request.

10. The apparatus of claim 9, the wired connection including at least one of an integrated drive electronics (IDE) connection, advanced host controller interface (AHCI) connection, advanced technology attachment (ATA) connection, serial ATA (SATA) connection, serial attached small computer system interface (SAS) connection, and non-volatile memory express (NVME) connection.

11. The apparatus of claim 9, the security element including a key associated with an X.509 certificate stored on the apparatus, verifying the security element including verifying the key associated with the X.509 certificate.

12. The apparatus of claim 11, comprising the controller to: report a security breach to a predetermined recipient upon determining the security element fails verification; and bypass sending a response to the host that verification of the request failed.

13. The apparatus of claim 9, the secure wireless connection being established based at least in part on a transport layer security (TLS) protocol.

14. The apparatus of claim 9, comprising the controller to: perform a security scan of the storage drive upon establishing the secure wireless connection.

15. A method comprising: receiving, by a hardware controller of a storage drive, a request from a host of the storage drive, the request being received via a wired connection between the storage drive and the host, the host comprising a machine enclosing the storage drive; determining, by the hardware controller, whether the request is flagged by the host as a secure connection request, the secure connection request requesting the storage drive establish a secure wireless connection between the host and the storage drive in addition to the wired connection between the storage drive and the host; processing, by the hardware controller, the request upon determining the request is not flagged as a secure connection request; establishing, by the hardware controller, a wireless connection between the storage drive and the host upon determining the request is flagged by the host as the secure connection request; and establishing, over the wireless connection, the secure wireless connection between the storage drive and the host upon verifying a security element included in the request.

16. The method of claim 15, the wired connection including at least one of a serial advanced technology attachment (SATA) wired connection, serial attached small computer system interface (SAS) wired connection non-volatile memory express (NVME) wired connection, and advanced host controller interface (AHCI) wired connection.

* * * * *